(12) United States Patent
Wiles et al.

(10) Patent No.: US 11,496,828 B2
(45) Date of Patent: Nov. 8, 2022

(54) SENSOR DRYING PATHWAY VIA CAPILLARY-INDUCED PRESSURE GRADIENT

(71) Applicant: Apple Inc., Cupertino, CA (US)

(72) Inventors: Brentley M. Wiles, Cupertino, CA (US); Mandeep Gill, Cupertino, CA (US); David MacNeil, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 602 days.

(21) Appl. No.: 16/569,591

(22) Filed: Sep. 12, 2019

(65) Prior Publication Data

US 2021/0080912 A1 Mar. 18, 2021

(51) Int. Cl.
| | | |
|---|---|---|
| G06F 1/16 | (2006.01) | |
| H04R 1/10 | (2006.01) | |
| C02F 1/28 | (2006.01) | |
| H05K 5/02 | (2006.01) | |
| G04G 17/08 | (2006.01) | |
| G04G 21/04 | (2013.01) | |

(52) U.S. Cl.
CPC ............. *H04R 1/1075* (2013.01); *C02F 1/28* (2013.01); *G06F 1/163* (2013.01); *G06F 1/1656* (2013.01); *H05K 5/0213* (2013.01); *G04G 17/08* (2013.01); *G04G 21/04* (2013.01)

(58) Field of Classification Search
CPC .. G06F 1/163; G06F 1/1656; G06F 2200/201; G06F 1/203; H05K 5/0213; G04G 17/08; G04G 21/04; G04G 21/02; H04R 1/1075; C02F 1/28
See application file for complete search history.

(56) References Cited

U.S. PATENT DOCUMENTS

| | | | |
|---|---|---|---|
| 9,516,437 B2 * | 12/2016 | van Halteren | ......... H04R 25/65 |
| 2011/0179806 A1 | 7/2011 | Ipposhi et al. | |

FOREIGN PATENT DOCUMENTS

| | | |
|---|---|---|
| CN | 109632180 | 4/2019 |
| JP | 2017-054609 | 3/2017 |

\* cited by examiner

*Primary Examiner* — James Wu
*Assistant Examiner* — Hung Q Dang
(74) *Attorney, Agent, or Firm* — Bakerhostetler (57) ABSTRACT

Aspects of the subject technology relate to an apparatus including one or more transducers, and a pathway for drying the one or more transducers via removal of water from vicinities of the transducers. The pathway includes a tubular structure, and the one or more transducers are disposed at a first opening of the tubular structure. The pathway is to facilitate removal of water via capillary-induced pressure gradient created by a capillary-dense material disposed at a second opening of the tubular structure at a distance from the transducers.

20 Claims, 7 Drawing Sheets

SENSOR DRYING PATHWAY VIA CAPILLARY-INDUCED PRESSURE GRADIENT

TECHNICAL FIELD

The present description relates generally to sensor technology, and more particularly, but not exclusively, to a sensor drying pathway via capillary-induced pressure gradient.

BACKGROUND

At small-scale dimensions, capillary forces outcompete the force of gravity. Capillary forces can be seen in phenomena as simple as water wicking up a paper towel or a curved meniscus forming on the inner surface of a drinking straw. Capillary forces have been used in many industrial applications. For example, in semiconductor industries heat pipes are used to cool heatsinks attached to semiconductor chips. The condensed vapor in such heat pipes moves back to an evaporator region along a wick structure by a capillary force along the interior wall of the heat pipe.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

It is understood that a transducer (e.g., a sensor) clogging with water, as a result of being exposed to humidity and water, may take a relatively long time (e.g., hours) to completely clear, because drying of the water can be slow. The subject technology is directed to an apparatus with a transducer drying pathway. The apparatus of the subject technology includes one or more transducers and a pathway for drying the transducers via removal of water from the vicinity of the transducers. The pathway includes a tubular structure, and transducers are disposed at a first opening of the tubular structure. The pathway facilitates removal of water via a capillary-induced pressure gradient created by a capillary-dense material disposed at a second opening of the tubular structure at a distance from the transducers.

In one or more implementations, the tubular structure is a U-shape cylindrical tube and the transducers are disposed around a periphery of the first opening. The capillary-dense material is disposed to fill a second opening and a portion of the U-shape cylindrical tube at a distance from the first opening. The capillary-dense material can be a sponge material or a material including one of a hydrophilic foam, cotton, wool glass fibers, glass beads or metal sawdust or swarf.

In some implementations, the tubular structure has a main cylindrical tube coupled to multiple cylindrical tube branches. The transducers are disposed around a periphery of an opening of the main cylindrical tube and the capillary-dense material is disposed to fill portions of the multiple cylindrical tube branches.

In one or more implementations, the tubular structure is a cylindrical tube and further includes a polymeric porous membrane made of polytetrafluoroethylene disposed at a second opening of the cylindrical tube, and the capillary-dense material is disposed over the polymeric porous membrane. The transducers and the tubular structure can be miniature sized with dimensions of a few millimeters. The transducers include speakers, microphones and environmental sensors such as pressure sensors, gas sensors and/or particulate matter sensors.

In some implementations, the apparatus of the subject technology is embedded in a smartwatch including a band made of a capillary-dense material. In this implementation, the one or more transducers are coupled via tubes to the band, which facilitates removal of water from the vicinity of the transducers via a capillary-induced pressure gradient created by the capillary-dense material of the band.

The direct benefits of using capillary-drying pathways is multifold. For example, capillary-drying pathways allow optimal sensor placement in a first-to-dry region, and can create an area that consistently exposes a high vapor pressure region of free surface water to maximum convection for best evaporation versus partial drying and worse evaporation over time. Further, the capillary-drying pathways provide more drying surface area and decreases drying time, without impacting power usage (battery lifetime) and with minimal cost.

Figure 1:
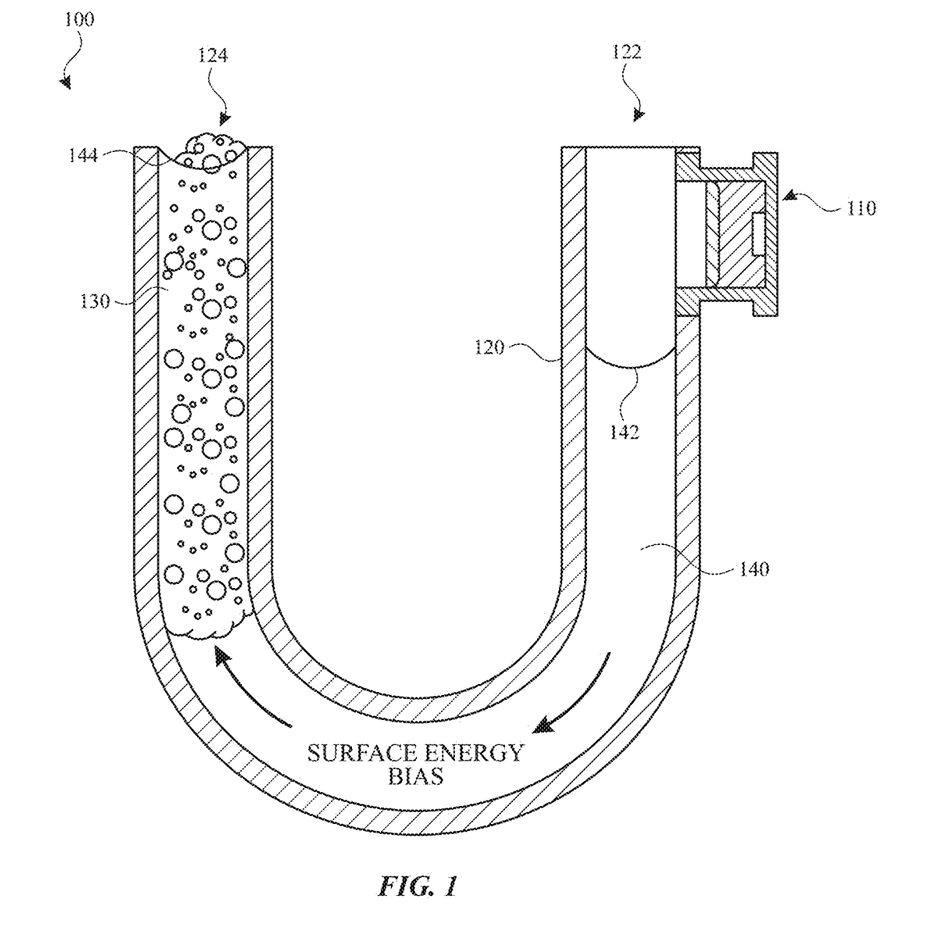
FIG. 1 illustrates a schematic diagram of an example of an apparatus including a sensor drying pathway via capillary-induced pressure gradient, in accordance with various aspects of the subject technology.

FIG. 1 illustrates a schematic diagram of an example of an apparatus 100 including a sensor drying pathway via capillary-induced pressure gradient, in accordance with various aspects of the subject technology. The apparatus 100 can be embedded in an electronic device such as a wireless communication device such as a smartwatch or a smartphone. The apparatus 100 includes a transducer 110, a tubular structure 120 and a capillary-dense material 130. Examples of the transducer 110 includes speakers, microphones and environmental sensors such as pressure sensors, gas sensors and/or particulate matter sensors. In the embodiment of FIG. 1, the tubular structure 120 is a simple U-shape tube with a first opening (end) 122 and a second opening (end) 124. In one or more implementations, the tubular structure 120 can be made of glass or a glass-filled plastic material, and can have dimensions within about 2-6 mm.

The transducer 110 is disposed at a periphery of the first opening 122. In some implementations, more than one (e.g., four) transducers are disposed at the first end 122. The capillary-dense material 130 is disposed to fill a portion of the tubular structure 120 near the second end 124. In some implementations, example materials of the capillary-dense material 130 includes sponges, hydrophilic foams, cotton, wool, glass fibers, glass beads or metal sawdust or swarf. The capillary-dense material 130 creates a capillary-induced pressure gradient that can remove water 140 from the portion of the tubular structure 120 near the transducer 110 and assist in quick drying of the transducer 110. In the apparatus 100, as shown in FIG. 1, the apparent water level 142 in the first branch of the tubular structure 120 is lower than the apparent water level 144 in the second branch of the tubular structure 120, which is an indication of a surface energy bias between the two branches. The surface energy bias is due to the hydrophilic properties of the capillary-dense material 130 that is behind the capillary-induced pressure gradient created in the tubular structure 120. The surface energy bias can be controlled by the amount and the hydrophilic properties of the material of the capillary-dense material 130.

Figure 2:
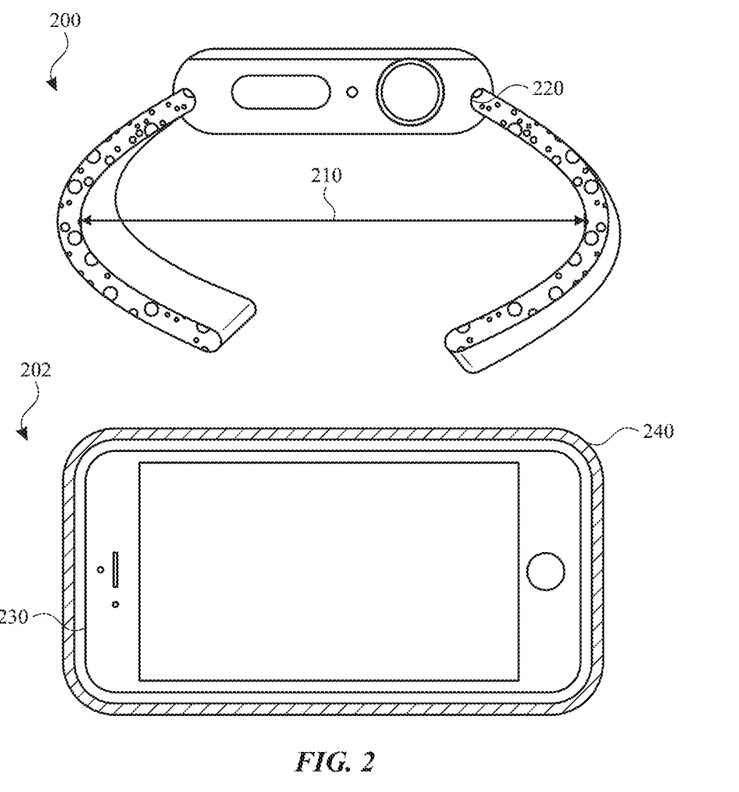
FIG. 2 illustrates a perspective view of example electronic devices including one or more sensors having drying pathways through attachments made of a capillary dense material, in accordance with various aspects of the subject technology.

FIG. 2 illustrates a perspective view of example electronic devices 200 and 202 including one or more sensors having drying pathways through attachments made of a capillary dense material, in accordance with various aspects of the subject technology. The electronic device 200 is a smartwatch having one or more transducers (e.g., sensors). The attachment, in case of the electronic device 200, is a band 210. The band 210 is made of a capillary-dense material and is able to remove water from the vicinity of the transducer ports such as a transducer port 220 via a capillary-induced pressure gradient across the entire length of the band. More details regarding connection of the transducer port 220 to the band 210 are disclosed below.

The electronic device 202 can be a smartphone, a tablet or another hand-held electronic device having one or more transducers (e.g., sensors). The attachment of the electronic device 202 is, for example, a case 240 that can be made of a capillary-dense material. The capillary-dense material of the case 240 can create a capillary-induced pressure gradient across the entire area of the case 240 that facilitates the removal of water from the vicinity of the transducer ports such as a transducer port 230 by evaporation from the surface area of the case 240.

Figure 3:
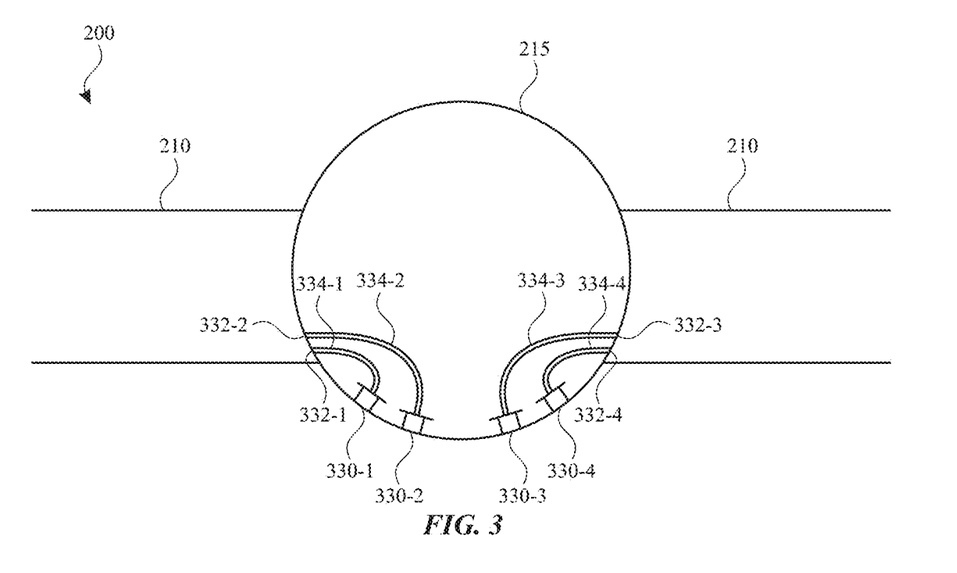
FIG. 3 illustrates a top view of the example smartwatch of FIG. 2 showing the sensors and the drying pathways to the band, in accordance with various aspects of the subject technology.

FIG. 3 illustrates a top view of the example smartwatch 200 of FIG. 2 showing the sensors and the drying pathways to the band, in accordance with various aspects of the subject technology. The smartwatch 200 includes a number of transducers 330 (e.g., 330-1, 330-2, 330-3 and 330-4) which are disposed around the periphery of the watch case 215. In some implementations, the transducers 330 can be speakers, microphones or sensors such as environmental sensors, pressure sensors or other transducers. The transducers 330 can get wet due to exposure to humidity or water, and the built-up water can affect proper operation of the transducers 330. It would be desirable to have the water removed from the vicinity of the transducer 330 as quickly as possible. The subject technology allows such water removal via the band 210 that is made of a capillary-dense material (e.g., including hydrophilic foam, cotton, wool or glass fibers). The band 210 is connected to ports 332 (e.g., 332-1, 332-2, 332-3 and 332-4) of tubes 334 (e.g., 334-1, 334-2, 334-3 and 334-4) that are coupled at their other ends to the transducers 330. The tubes 334 can transport water away from the transducers 330 via capillary-induced forces into the band 210 that can in turn facilitate removal of water via capillary-induced pressure and evaporation.

Figure 4:
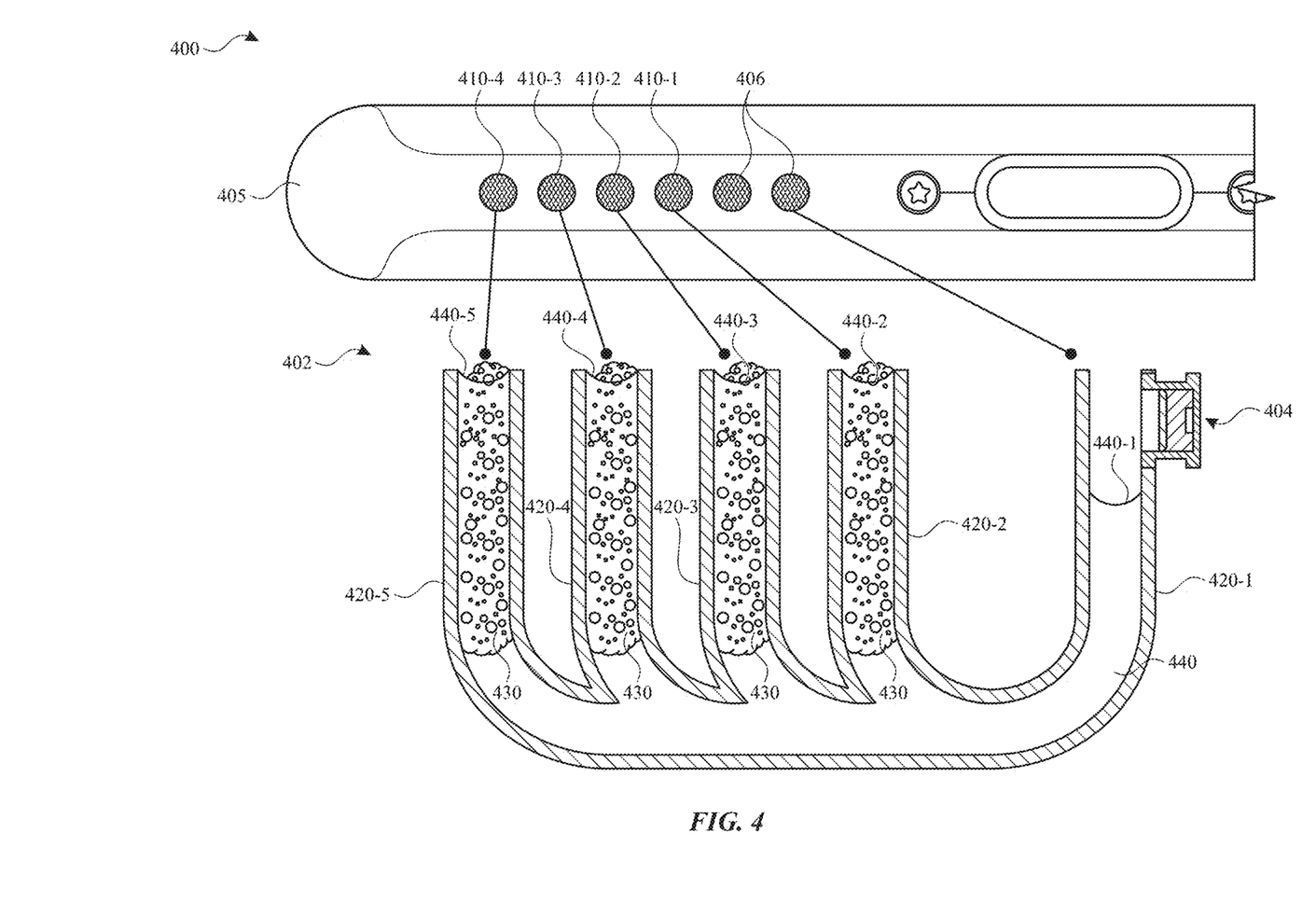
FIG. 4 illustrates a schematic diagram of a side view of an example smartphone including multiple transducers having drying pathways through a tubular structure, in accordance with various aspects of the subject technology.

FIG. 4 illustrates a schematic diagram of a side view of an example smartphone 400 including multiple transducers having drying pathways through a tubular structure 402, in accordance with various aspects of the subject technology. The smartphone 400 includes a number of transducers (e.g., sensors) such as one or more transducers 404 having transducer ports 406 on a case 405 of the smartphone 400. The transducer 404 can be exposed to humidity and/or water that can adversely affect the operation of the smartphone 400. The subject technology provides a tubular structure 402 that can assist in removing water from the vicinity of the transducer 404. The tubular structure 402 includes multiple braches (tubes) 420 (e.g., 420-1, 420-2, 420-3, 420-4 and 420-5) including the main branch 420-1. The tubular structure 402 can be made of glass or a glass-filled plastic (polymer) and can have dimensions of a few millimeters.

The transducer 404 is disposed around an opening of the main branch 420-1, and the openings of the exhaust branches 420-2, 420-3, 420-4 and 420-5 are coupled to the exhaust ports 410 (e.g., 410-1, 410-2, 410-3 and 410-4) on the case 405. The exhaust branches 420-2, 420-3, 420-4 and 420-5 are at least partially filed with a capillary-dense material (e.g., including hydrophilic foam, glass fibers, wool or cotton) that extend to the exhaust ports 410. In the tubular structure 402, as shown in FIG. 4, the apparent water level 440-1 of water 440 in the main branch 420-1 of the tubular structure 402 is lower than the apparent water level 440-2, 440-3, 440-4 and 440-5 in the exhaust branches 420-2, 420-3, 420-4 and 420-5, which is an indication of a surface energy bias between the main branch 420-1 and the exhaust branches 420-2, 420-3, 420-4 and 420-5. The surface energy bias is due to the hydrophilic properties of the capillary-dense material 430 that is the cause of the capillary-induced pressure gradient created in the tubular structure 402. The surface energy bias can be controlled by the amount and the hydrophilic properties of the material of the capillary-dense material 430.

Figure 5:
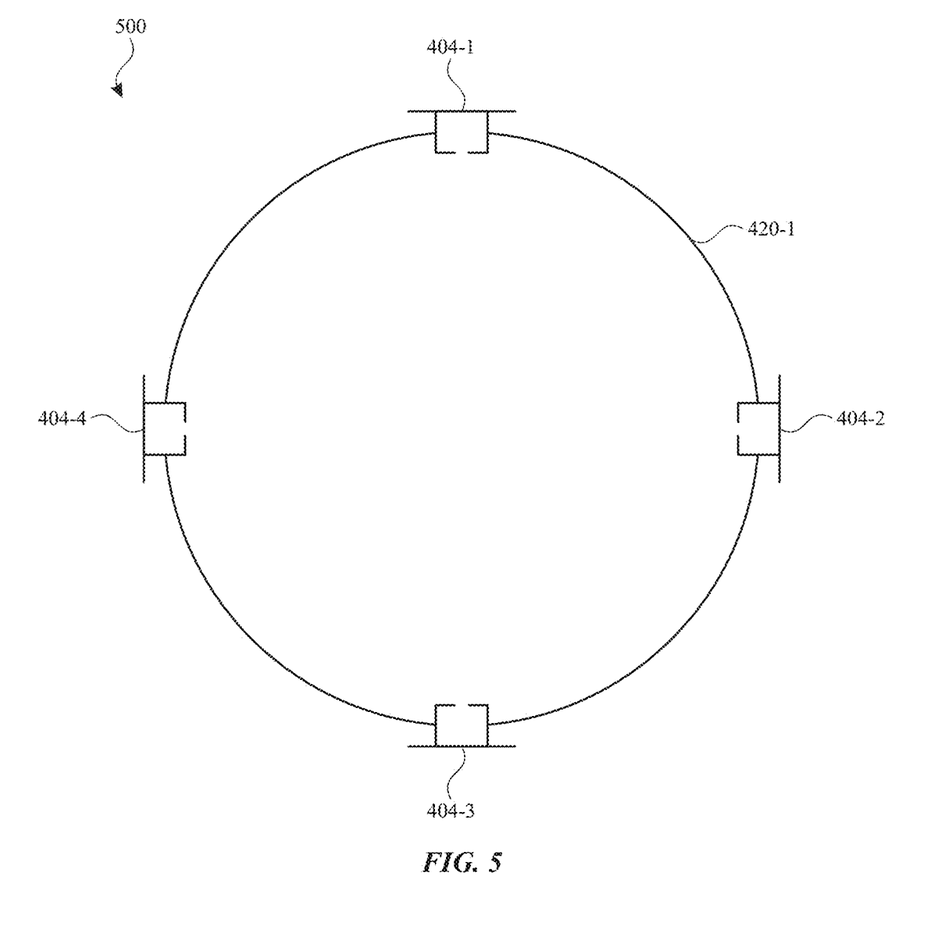
FIG. 5 illustrates a top view of the main tube of the tubular structure of the example smartphone of FIG. 4 showing an example arrangement of transducers, in accordance with various aspects of the subject technology.

FIG. 5 illustrates a top view of the main tube 420-1 of the tubular structure 402 of the example smartphone 400 of FIG. 4 showing an example arrangement 500 of transducers 404, in accordance with various aspects of the subject technology. In the arrangement 500 shown in the top view of the main tube 420-1 of the tubular structure 402, four transducers (e.g., sensors) 404 (404-1, 404-2, 404-3 and 404-4) are disposed around the wall of the main tube 420-1 near its opening. The number of transducers 404 is not limited to four and depends on the requirements of the smartphone 400 and the size of the main tube 420-1 of the tubular structure 402. In some implementations, the transducers 404 can be speakers, microphones or sensors such as pressure sensor and/or environmental sensors that are protected against water and humidity exposure via fast drying through the tubular structure 402, as explained above.

Figure 6:
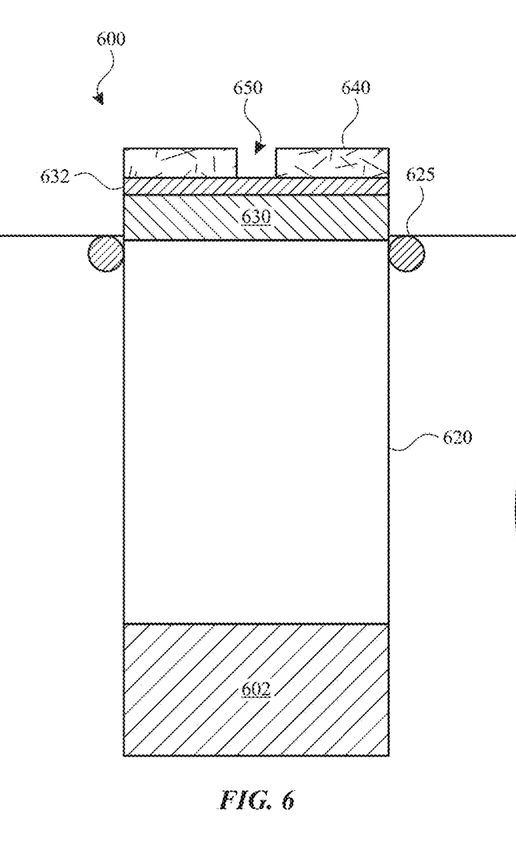
FIG. 6 illustrates a schematic diagram showing a cross-sectional view of an example apparatus including a sensor drying pathway via capillary-induced pressure gradient, in accordance with various aspects of the subject technology.

FIG. 6 illustrates a schematic diagram showing a cross-sectional view of an example apparatus 600 including a sensor-drying pathway 620 via capillary-induced pressure gradient, in accordance with various aspects of the subject technology. The example apparatus 600 includes a transducer 602, the sensor-drying pathway (a tube) 620, a coupling layer 630, a foam layer 632 and a capillary-dense material layer 640. The transducer 602 can be a sensor such as a pressure sensor or an environmental sensor. The tube 620 can be made of glass or a glass-filled plastic and is attached to a housing of a host device (e.g., a handheld communication device) via an O-ring 625. The coupling layer 640 can be made of a synthetic fluoropolymer such as polytetrafluoroethylene (PTFE). The capillary-dense material layer 640 can be made, for example, of a material including hydrophilic foam or glass fibers and has an opening 650 in the middle. The water around the transducer 602 can be moved to the capillary-dense material layer 640 via the capillary-induced pressure gradient inside the tube 620 due to the hydrophilic properties of the capillary-dense material layer 640 and exposed to the environment via the opening 650.

Figure 7:
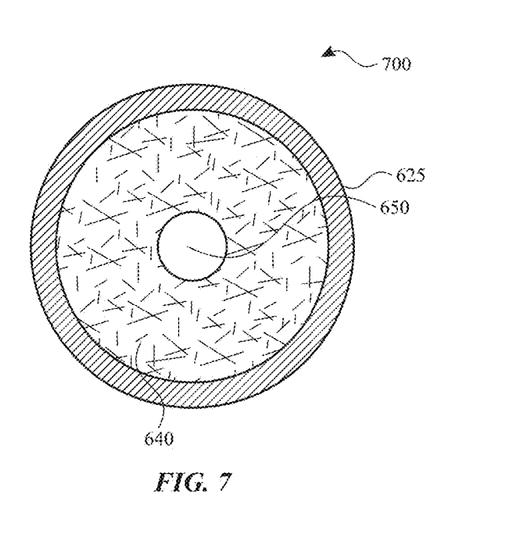
FIG. 7 illustrates a top view of the example apparatus of FIG. 6, in accordance with various aspects of the subject technology.

FIG. 7 illustrates a top view 700 of the example apparatus 600 of FIG. 6, in accordance with various aspects of the subject technology. The top view 700 shows the O-ring 625, the capillary-dense material layer 640 and the opening 650, as described above.

Figure 8:
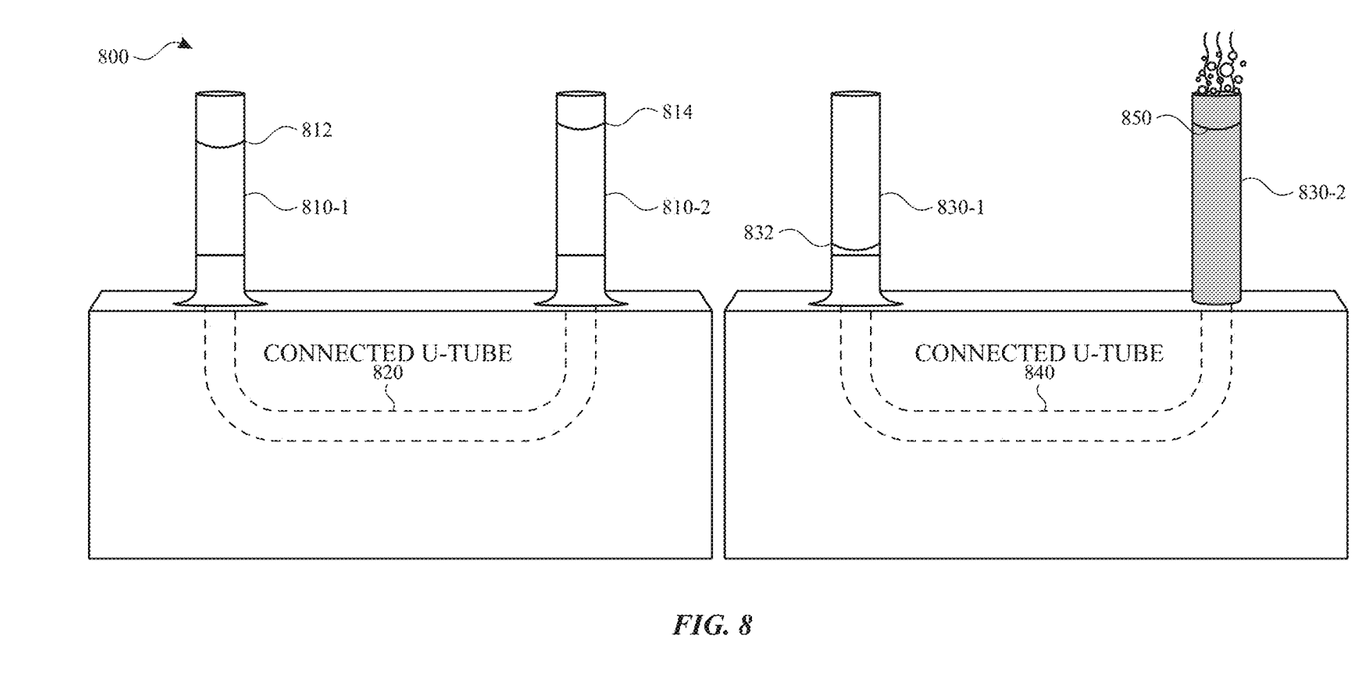
FIG. 8 illustrates a side view of an example of an experimental setup showing performance of a sensor drying pathway via capillary-induced pressure gradient, in accordance with various aspects of the subject technology.

FIG. 8 illustrates a side view of an example of an experimental setup 800 showing performance of a sensor-drying pathway via capillary-induced pressure gradient, in accordance with various aspects of the subject technology. In the experimental setup 800, the U-shaped tube 820 is coupled to tubes 810 (810-1 and 810-2) and the tubes are simply filled with water. The apparent water level in tubes 810-1 and 810-2 are almost the same, as expected. The U-shape tube 840 of the experimental setup 800, however, is coupled to tubes 830-1 and 830-2 that are not simply filled with water. The tube 830-2 is at least partially filled with a capillary-dense material 850, which is responsible for different apparent water levels in the tubes 830-1 and 830-2. The water in the U-shaped tube 840 is sucked to the top of the tube 830-2 and evaporated due to the hydrophilic property of the capillary-dense material 850 that creates a capillary-induced pressure resulting in the surface energy bias.

Figure 9:
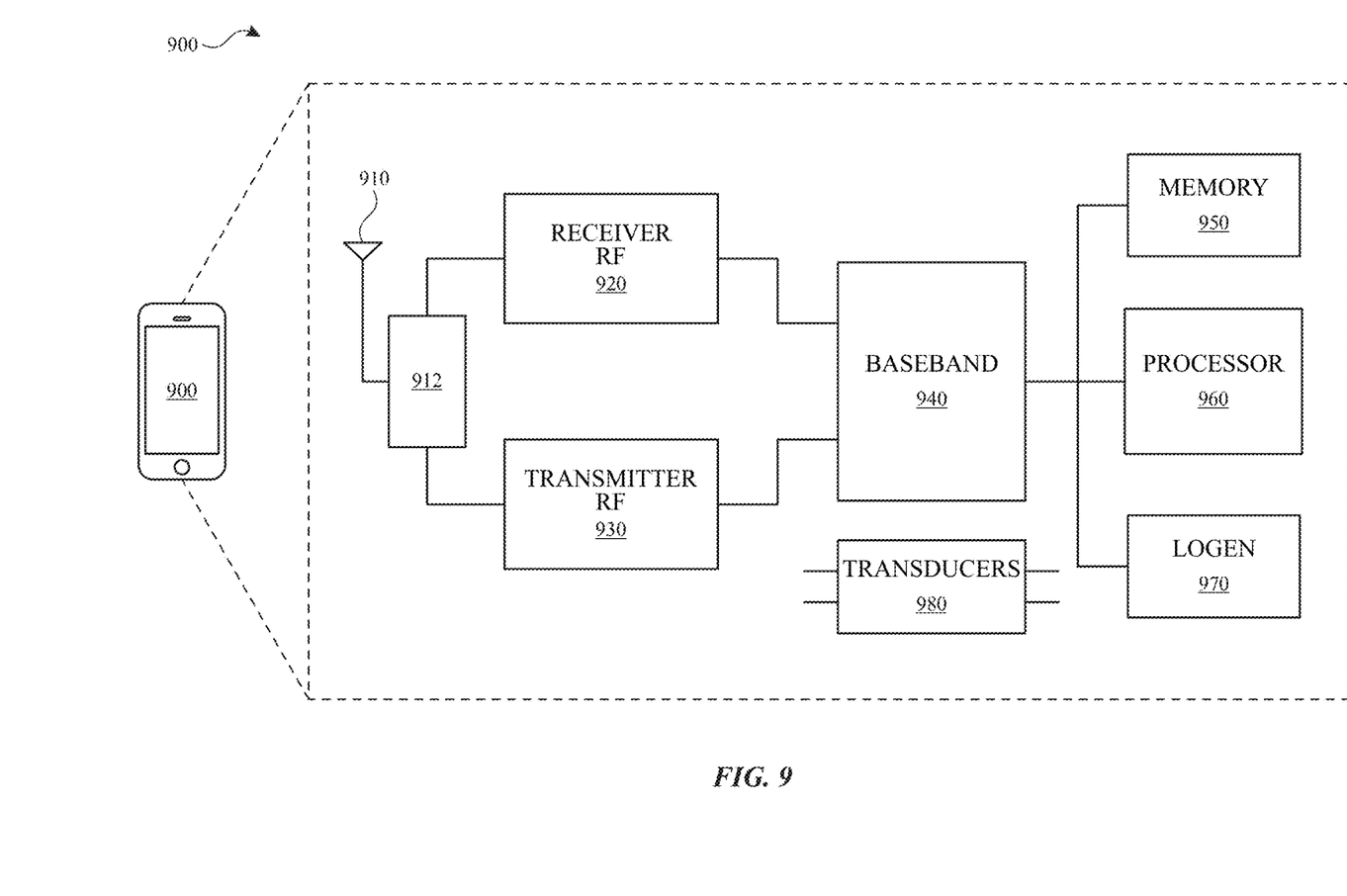
FIG. 9 illustrates a wireless communication device in which aspects of subject technology are implemented.

FIG. 9 illustrates a wireless communication device 900 in which aspects of the subject technology are implemented. In one or more implementations, the wireless communication device 900 can be a smart phone or a smartwatch that hosts an apparatus of the subject technology, for example, for air-quality monitoring or pressure measurement. The wireless communication device 900 may comprise a radio-frequency (RF) antenna 910, a duplexer 912, a receiver 920, a transmitter 930, a baseband processing module 940, a memory 950, a processor 960, a local oscillator generator (LOGEN) 970 and one or more transducers 980. In various embodiments of the subject technology, one or more of the blocks represented in FIG. 9 may be integrated on one or more semiconductor substrates. For example, the blocks 920-970 may be realized in a single chip or a single system on a chip, or may be realized in a multi-chip chipset.

The receiver 920 may comprise suitable logic circuitry and/or code that may be operable to receive and process signals from the RF antenna 910. The receiver 920 may, for example, be operable to amplify and/or down-convert received wireless signals. In various embodiments of the subject technology, the receiver 920 may be operable to cancel noise in received signals and may be linear over a wide range of frequencies. In this manner, the receiver 920 may be suitable for receiving signals in accordance with a variety of wireless standards, Wi-Fi, WiMAX, Bluetooth, and various cellular standards. In various embodiments of the subject technology, the receiver 920 may not require any SAW filters and few or no off-chip discrete components such as large capacitors and inductors.

The transmitter 930 may comprise suitable logic circuitry and/or code that may be operable to process and transmit signals from the RF antenna 910. The transmitter 930 may, for example, be operable to up-convert baseband signals to RF signals and amplify RF signals. In various embodiments of the subject technology, the transmitter 930 may be operable to up-convert and amplify baseband signals processed in accordance with a variety of wireless standards. Examples of such standards may include Wi-Fi, WiMAX, Bluetooth, and various cellular standards. In various embodiments of the subject technology, the transmitter 930 may be operable to provide signals for further amplification by one or more power amplifiers.

The duplexer 912 may provide isolation in the transmit band to avoid saturation of the receiver 920 or damaging parts of the receiver 920, and to relax one or more design requirements of the receiver 920. Furthermore, the duplexer 912 may attenuate the noise in the receive band. The duplexer 912 may be operable in multiple frequency bands of various wireless standards.

The baseband processing module 940 may comprise suitable logic, circuitry, interfaces, and/or code that may be operable to perform processing of baseband signals. The baseband processing module 940 may, for example, analyze received signals and generate control and/or feedback signals for configuring various components of the wireless communication device 900, such as the receiver 920. The baseband processing module 940 may be operable to encode, decode, transcode, modulate, demodulate, encrypt, decrypt, scramble, descramble, and/or otherwise process data in accordance with one or more wireless standards.

The processor 960 may comprise suitable logic, circuitry, and/or code that may enable processing data and/or controlling operations of the wireless communication device 900. In this regard, the processor 960 may be enabled to provide control signals to various other portions of the wireless communication device 900. The processor 960 may also control transfer of data between various portions of the wireless communication device 900. Additionally, the processor 960 may enable implementation of an operating system or otherwise execute code to manage operations of the wireless communication device 900.

The memory 950 may comprise suitable logic, circuitry, and/or code that may enable storage of various types of information such as received data, generated data, code, and/or configuration information. The memory 950 may comprise, for example, RAM, ROM, flash, and/or magnetic storage. In various embodiments of the subject technology, information stored in the memory 950 may be utilized for configuring the receiver 920 and/or the baseband processing module 940.

The LOGEN 970 may comprise suitable logic, circuitry, interfaces, and/or code that may be operable to generate one or more oscillating signals of one or more frequencies. The LOGEN 970 may be operable to generate digital and/or analog signals. In this manner, the LOGEN 970 may be operable to generate one or more clock signals and/or sinusoidal signals. Characteristics of the oscillating signals such as the frequency and duty cycle may be determined based on one or more control signals from, for example, the processor 960 and/or the baseband processing module 940.

In operation, the processor 960 may configure the various components of the wireless communication device 900 based on a wireless standard according to which it is desired to receive signals. Wireless signals may be received via the RF antenna 910, amplified, and down-converted by the receiver 920. The baseband processing module 940 may perform noise estimation and/or noise cancellation, decoding, and/or demodulation of the baseband signals. In this manner, information in the received signal may be recovered and utilized appropriately. For example, the information may be audio and/or video to be presented to a user of the wireless communication device, data to be stored to the memory 950, and/or information affecting and/or enabling operation of the wireless communication device 900. The baseband processing module 940 may modulate, encode, and perform other processing on audio, video, and/or control signals to be transmitted by the transmitter 930 in accordance with various wireless standards.

The one or more transducers 980 may include miniature transducers (e.g., 110 of FIG. 1 or 330 of FIG. 3) that are protected against damages due to humidity and water by drying via the capillary-induced pressure gradient of the subject technology, as discussed above, for example, with respect to FIGS. 1 through 6. The drying apparatus of the subject technology is a miniature device that can readily be integrated with the one or more transducers 980. In one or more implementations, the processor 960 can process signals from the one or more transducers 980, to determine environmental parameters such as pressure, particulate matter velocity, smell, and so on.

In accordance with various aspects of the subject disclosure, a particulate matter sensor is provided that includes three light sources and three total-internal-reflection lenses. The three light sources are arranged to emit three corresponding light beams respectively into the three total-internal-reflection lenses. The three total-internal-reflection lenses are arranged to redirect the three corresponding light beams into three corresponding directions that form an orthogonal basis in a three-dimensional space.

In accordance with other aspects of the subject disclosure, a method is provided that includes emitting three light beams from three corresponding light sources into three corresponding total-internal-reflection lenses. The method also includes redirecting, with the three corresponding total-internal-reflection lenses, the three emitted light beams into three corresponding directions that form an orthogonal basis in three dimensions to converge at at least one convergence location. The method also includes detecting, with three corresponding light detectors, changes in the operation of the three light sources due to reflection or backscattering of the three light beams within a measurement volume around at least one convergence location. The method also includes determining one or more particulate matter concentrations in a gas based on the detected changes.

In accordance with other aspects of the subject disclosure, an electronic device having a particulate matter sensor is provided, the particulate matter sensor configured to emit three light beams from three corresponding light sources into three corresponding total-internal-reflection lenses. The particulate matter sensor is further configured to redirect, with the three corresponding total-internal-reflection lenses, the three emitted light beams into three corresponding directions that form an orthogonal basis in a three dimensional space. The particulate matter sensor is further configured to detect, with three corresponding light detectors, changes in the operation of the three light sources due to reflection or backscattering of the three redirected light beams within a measurement volume around one or more convergence locations of the three redirected light beams. The particulate matter sensor is further configured to determine one or more particulate matter concentrations in a gas based on the detected changes.

Various functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application-specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device as described herein for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described herein is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or design All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An apparatus comprising:
   one or more transducers; and a pathway for drying the one or more transducers via removal of water from vicinities of the one or more transducers, wherein:

the pathway comprises a tubular structure, the one or more transducers are disposed at a first opening of the tubular structure, and the pathway is configured to facilitate removal of water via capillary-induced pressure gradient within the tubular structure created by a capillary-dense material disposed at a second opening of the tubular structure at a distance from the one or more transducers, wherein the tubular structure comprises at least one U-shape cylindrical tube with two branches having a surface energy bias due to the capillary-dense material.

2. The apparatus of claim 1, wherein the one or more transducers are disposed around a periphery of the first opening and the capillary-dense material is disposed to fill a second opening and a portion of the U-shape cylindrical tube at a distance from the first opening.

3. The apparatus of claim 1, wherein the capillary-dense material comprises a sponge material or a material including at least one of a hydrophilic foam, cotton, wool, glass fiber, glass beads or metal sawdust or swarf.

4. The apparatus of claim 1, wherein the tubular structure comprises a main cylindrical tube coupled to multiple cylindrical tube branches.

5. The apparatus of claim 4, wherein the one or more transducers are disposed around a periphery of an opening of the main cylindrical tube and the capillary-dense material is disposed to fill portions of the multiple cylindrical tube branches.

6. The apparatus of claim 5, wherein the tubular structure further comprises a polymeric porous membrane made of polytetrafluoroethylene (PTFE) disposed at a second opening of the cylindrical tube.

7. The apparatus of claim 6, wherein the capillary-dense material is disposed over the polymeric porous membrane.

8. The apparatus of claim 1, wherein the one or more transducers are miniature transducers with dimensions of a few millimeters and comprise speakers, microphones and environmental sensors including pressure sensors, gas sensors and/or particulate matter sensors.

9. The apparatus of claim 1, wherein the tubular structure is a miniature structure with dimensions of a few millimeters.

10. An electronic device comprising:

one or more transducers exposed to at least one of humidity or water;

a tubular structure coupled at a first end to the one or more transducers and forming a pathway for drying the one or more transducers; and a capillary-dense material disposed at a second end of the tubular structure and configured to facilitate removal of water from the one or more transducers via capillary-induced pressure gradient within the tubular structure, wherein the tubular structure comprises at least one U-shape cylindrical tube with two branches having a surface energy bias due to the capillary-dense material.

11. The electronic device of claim 10, wherein the one or more transducers a disposed around a periphery of the first end of the U-shaped cylindrical tube, and wherein the capillary-dense material is disposed at the second end of the U-shaped cylindrical tube.

12. The electronic device of claim 10, wherein the tubular structure comprises a main cylindrical tube coupled to multiple cylindrical tube branches, and wherein the one or more transducers are disposed around a periphery of an opening of the main cylindrical tube and the capillary-dense material is disposed to fill portions of the multiple cylindrical tube branches.

13. The electronic device of claim 10, wherein the tubular structure comprises a polymeric porous membrane made of PTFE disposed at a second opening of the cylindrical tube.

14. The electronic device of claim 13, wherein the capillary-dense material is disposed over the polymeric porous membrane.

15. The electronic device of claim 10, wherein the one or more transducers are miniature transducers with dimensions of a few millimeters and comprise speakers, microphones and environmental sensors including pressure sensors, gas sensors and/or particulate matter sensors.

16. The electronic device of claim 10, wherein the tubular structure is a miniature structure with dimensions of a few millimeters.

17. The electronic device of claim 10, wherein the capillary-dense material comprises a sponge material or a material including at least one of a hydrophilic foam, cotton, wool, glass fiber, glass beads or metal sawdust or swarf.

18. A wireless communication device comprising:

one or more transducers;

an attachment made of a capillary-dense material; and one or more pathways, at a first opening, disposed to couple the one or more transducers to the attachment, wherein:

the one or more pathways are configured to allow transport of water from vicinities of one or more transducers to the attachment, the attachment, at a second opening, releases the water to a surrounding environment, and the one or more pathways comprise a tubular structure including the attachment, wherein the tubular structure comprises at least one U-shape cylindrical tube with two branches having a surface energy bias.

19. The wireless communication device of claim 18, wherein the wireless communication device comprises a smartwatch and the attachment comprises a band made of the capillary-dense material and coupled via one or more tubes to the one or more transducers.

20. The wireless communication device of claim 18, wherein the wireless communication device comprises a smartphone and the attachment comprises a case made of the capillary-dense material and coupled via one or more tubes to the one or more transducers.

* * * * *